(12) United States Patent
Liu et al.

(10) Patent No.: US 7,641,041 B1
(45) Date of Patent: Jan. 5, 2010

(54) CONVEYING DEVICE

(75) Inventors: Ming-Hsun Liu, Taipei (TW);
Chung-Hsuan Tsai, Taipei (TW);
Fa-Chin Lee, Taipei (TW)

(73) Assignee: Datatronics Technology, Inc. (TW)

( * ) Notice: Subject to any disclaimer, the term of this patent is extended or adjusted under 35 U.S.C. 154(b) by 47 days.

(21) Appl. No.: 12/175,339

(22) Filed: Jul. 17, 2008

(51) Int. Cl.
*B65G 47/04* (2006.01)

(52) U.S. Cl. ...................... 198/468.8; 414/569; 187/256

(58) Field of Classification Search ............ 198/468.01, 198/468.8, 468.9, 832, 835; 414/569, 594; 187/256; 242/352.4; 254/265, 266, 278
See application file for complete search history.

(56) References Cited

U.S. PATENT DOCUMENTS

| | | | | |
|---|---|---|---|---|
| 1,586,768 A | * | 6/1926 | Allen | ......................... 187/256 |
| 2,025,575 A | * | 12/1935 | Danz | .......................... 414/594 |
| 2,265,891 A | * | 12/1941 | Bertelsen | ..................... 187/256 |
| 2,609,111 A | * | 9/1952 | Daves et al. | ................. 414/594 |
| 3,417,857 A | * | 12/1968 | Hickey | ..................... 198/463.4 |
| 4,313,266 A | * | 2/1982 | Tam | ........................ 198/468.8 |

* cited by examiner

*Primary Examiner*—James R Bidwell
(74) *Attorney, Agent, or Firm*—Banger Shia

(57) ABSTRACT

A conveying device comprises a body in which a power source and two scroll wheels of the same diameter and rotating synchronously are disposed. Each scroll wheel is wound with an elongated elastic extension plate having rigidity, and one end of each elastic extension plate extends out of the body. When in use, the power source is used to drive the two scroll wheel to rotate synchronously, so as to drive the elastic extension plates of the two scroll wheels to synchronously extend out of or retract in the body. When the ends of the two elastic extension plates extended out of the body are assembled with a clamp or a loading seat, thereby, the conveying operation can be carried out.

10 Claims, 6 Drawing Sheets

CONVEYING DEVICE

BACKGROUND OF THE INVENTION

1. Field of the Invention

The present invention relates to a conveying device, and more particularly to a conveying device which utilizes the synchronous movement of two elastic extension plates to offer the conveying function.

2. Description of the Prior Art

Regarding most of the automatic flows, no matter in the fabrication of semiconductor or in the fabrication and burning operation of the optical disc, the conveying step can not be omitted. Conventional conveying devices all utilize a platform which moves along a fixed rail to offer the conveying function. If focusing on the stability, two parallel rails are provided for the movement of the platform. However, the shortcoming of this conveying device is that its rails are positioned on the floor, so the conveying path also must be fixed according to the rails, and the conveying path cannot be changed flexibly.

In addition, when the conveying device is not used, since the rails are positioned on the floor and cannot be disassembled freely, it will cause a spatial obstacle. Consequently, how to solve the abovementioned problems is one objective of making the automatic flow much more progressive.

The present invention has arisen to mitigate and/or obviate the afore-described disadvantages.

SUMMARY OF THE INVENTION

The primary objective of the present invention is to provide a conveying device. It utilizes two scroll wheels which are the same in diameter and rotate synchronously to scroll an elastic extension plate with rigidity to extend or retract, respectively. The two elastic extension plates extend or retract synchronously, in order to offer the conveying function when the two elastic extension plates are assembled with a loading seat or a clamp and the like. Thus achieving the objective that rails are not needed to preset.

To achieve the abovementioned objective, the conveying device of the present invention comprises:

a body formed with a gap;

a power source assembled in the body;

two scroll wheels of the same diameter rotating synchronously, and rotating axes of the two wheels being parallel assembled in the body, the rotating directions of the two scroll wheels are opposite; and at least one of the scroll wheels being driven by the power source; and two elongated elastic extension plates with rigidity, one end of each elastic extension plate being fixed on each scroll wheel, and each elastic extension plate being wound on each scroll wheel from inside to outside, the other end of each elastic extension plate extending out of the body through the gap of the body, each elastic extension plate is driven to extend or retract through rotation of each scroll wheel, thus carrying out a conveying operation.

Both peripheries of the abovementioned two scroll wheels are formed with the same number of teeth, and the two scroll wheels rotate synchronously in opposite directions by an engagement of their teeth.

The power source is a motor.

The body further includes a driving mechanism which is driven to rotate by the power source and used to drive respective scroll wheels to rotate.

The driving mechanism is formed by a coaxial connection of an input part and an output part which are connected with the power source and one of the scroll wheels, respectively.

The input part and the output part of the driving mechanism are gears, and the input part and the output part are engaged with the power source and the scroll wheel, respectively.

The driving mechanism is formed by a coaxial connection of an input part, an output part and a driving part, the input part is connected with the power source, the output part and the driving part are, respectively, connected with the two scroll wheels.

Both the input part and the output part of the driving mechanism are gears, and the driving part is a belt pulley, and the input part is engaged with the power source, the output part is engaged with one of the scroll wheels, the driving part utilizes a belt to drive the other scroll wheel to rotate.

A loading seat is assembled to the ends of the two elastic extension plates extended out of the body.

A clamp is assembled to the ends of the two elastic extension plates extended out of the body.

A conveying method comprises the steps of: winding two elastic extension plates, from inside to outside, onto two parallel scroll wheels of the same diameter and rotating synchronously in opposite directions; positioning an object on the two elastic extension plates, rotating the two elastic extension plates and making the two elastic extension plates move synchronously and equidistantly; releasing the object after it is moved to a predefined position, to accomplish the conveying operation.

The advantages of the present invention are that: when the two scroll wheels are rotated in opposite directions by the power source, the two elastic extension plates will be driven to synchronously extend out of or retract in the body; and when the ends of the two elastic extension plates extended out of the body are assembled with a clamp or a loading seat, the conveying operation can be carried out; rails are not needed to preset, because of the two elastic extension plates which are used to perform the conveying operation; additionally, the conveying path can be changed by changing the extending or retracting direction of the two elastic extension plates.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Figure 1:
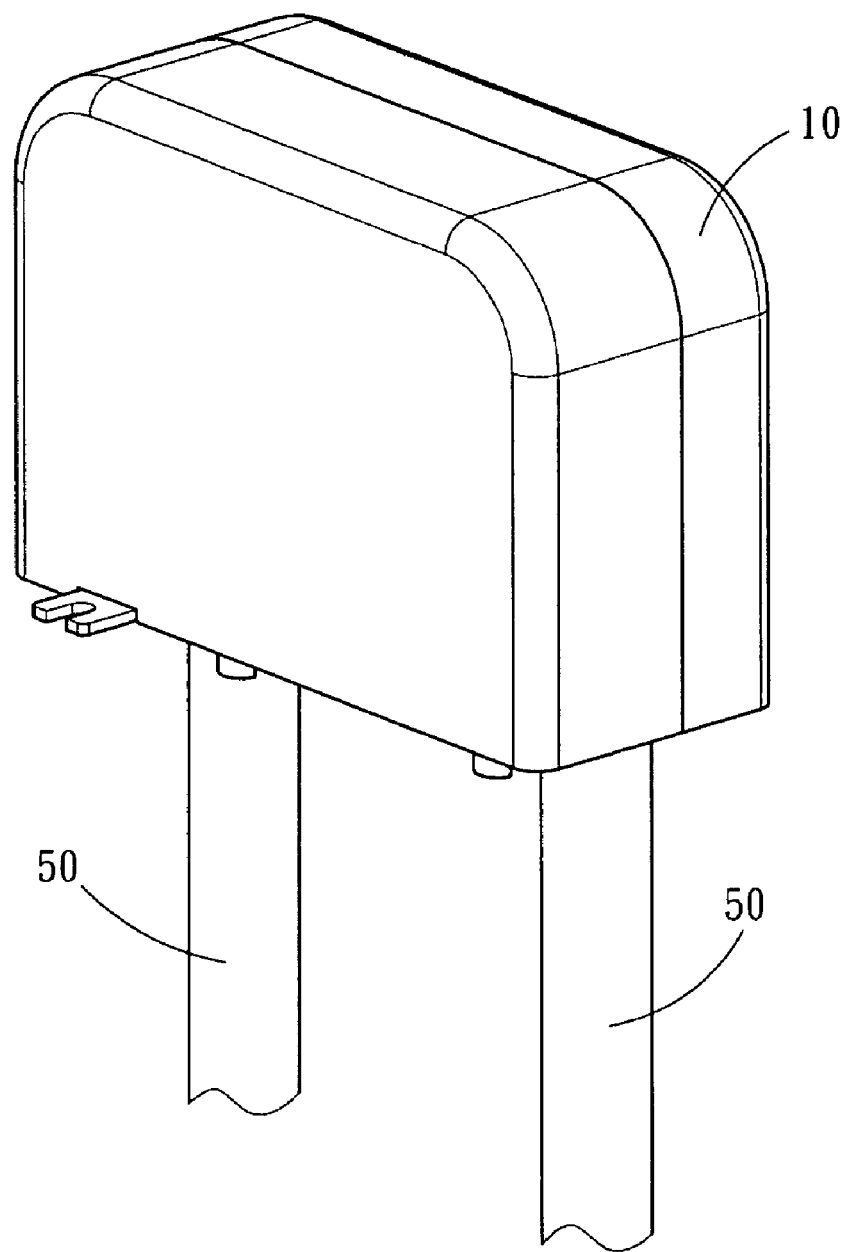
FIG. 1 is a perspective view of a conveying device in accordance with the present invention.
Figure 2:
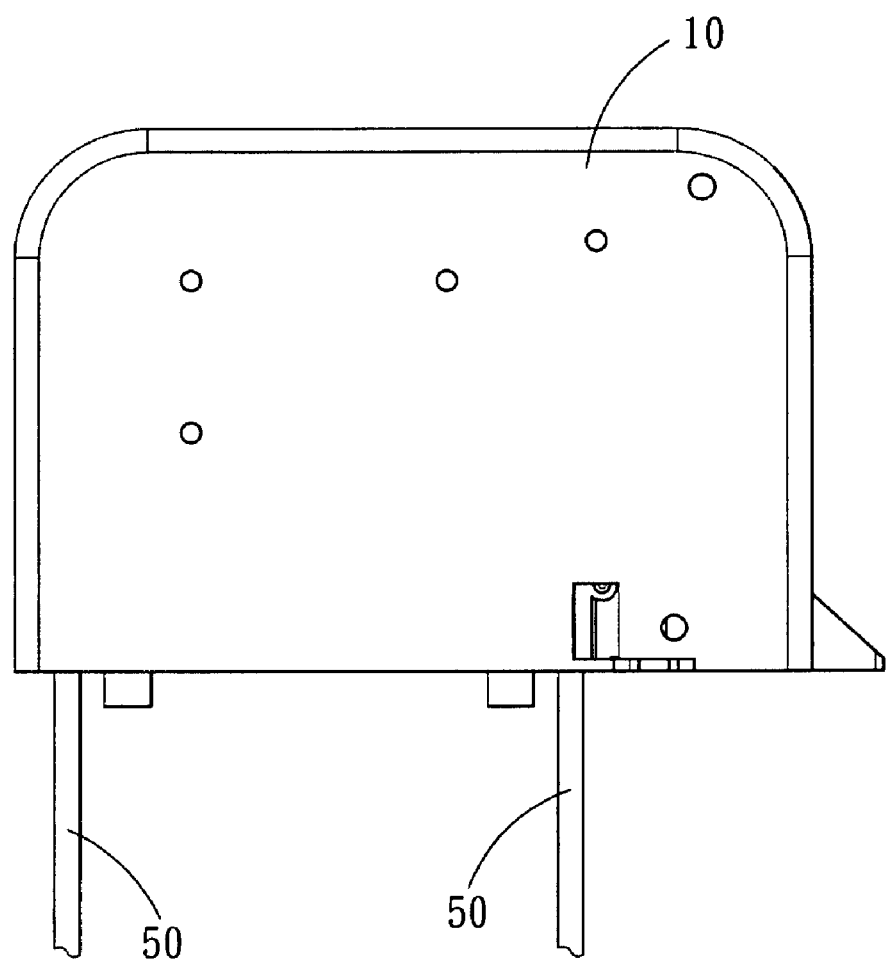
FIG. 2 is a side view of the conveying device in accordance with the present invention.
Figure 3:
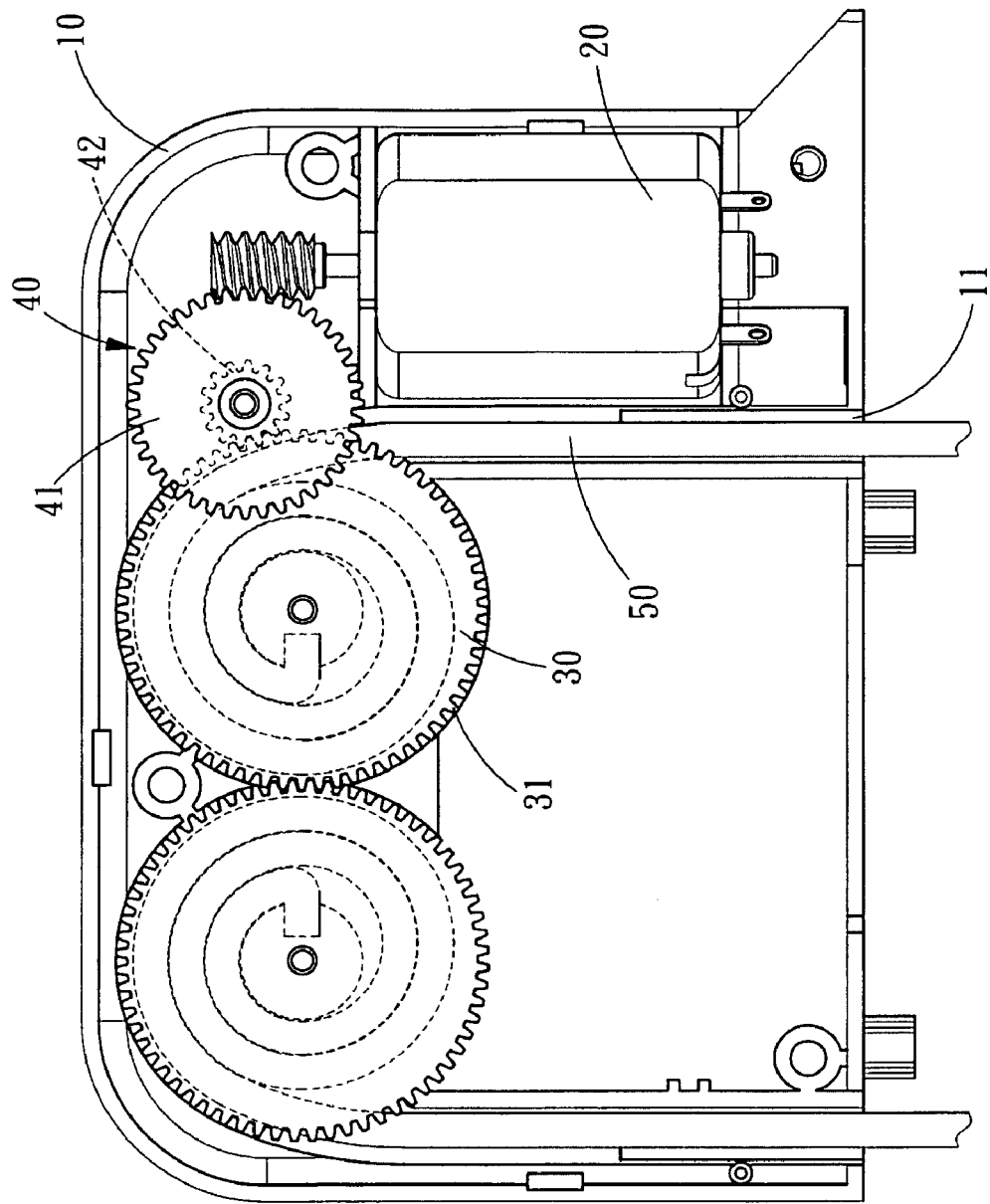
FIG. 3 shows that two scroll wheels are linked with each other by their teeth in accordance with the present invention.

Referring to FIGS. 1-3, a conveying device in accordance with a preferred embodiment of the present invention comprises a body 10, a power source 20 and two scroll wheels 30.

The body 20 includes a gap 11.

The power source 20 is assembled in the body 10, and the power source 20 of this preferred embodiment is a motor.

The two scroll wheels 30 are assembled in the body 10, and the two scroll wheels 30 are the same in diameter and linked with each other. At least one scroll wheel 30 is driven by the power source 20. Both the two scroll wheels 30 include a plurality of teeth 31. The two scroll wheels 30 have the same number of teeth 31 and are engaged with each other, so as to enable themselves to rotate synchronously in opposite directions. Moreover, the power source 20 utilizes a driving mechanism 40 to drive one of the scroll wheels 30 directly to rotate. The driving mechanism 40 of this embodiment is formed by the coaxial connection of an input part 41 and an output part 42. The input part 41 and the output part 42 are connected to the power source 20 and one of the scroll wheels 30 respectively. Moreover, both the input part 41 and the output part 42 are gears, and the number of the teeth of the input part 41 is larger than that of the output part 42. The input part 41 and the output part 42 are engaged with the power source 20 and one scroll wheel 30 respectively, by such arrangements that the power source 20 can utilize the driving mechanism 40 to drive one scroll wheel 30 to rotate. Additionally, each scroll wheel 30 is provided with an elongated elastic extension plate 50 having rigidity, and the elastic extension plate 50 is made of flexible alloy, plastic material or other similar materials. One end of each elastic extension plate 50 is fixed to each scroll wheel 30. Each elastic extension plate 50 is wound on each scroll wheel 30 from inside to outside. The other end of each elastic extension plate 50 extends out of the body 10 from the gap 11 of the body 10.

Figure 4:
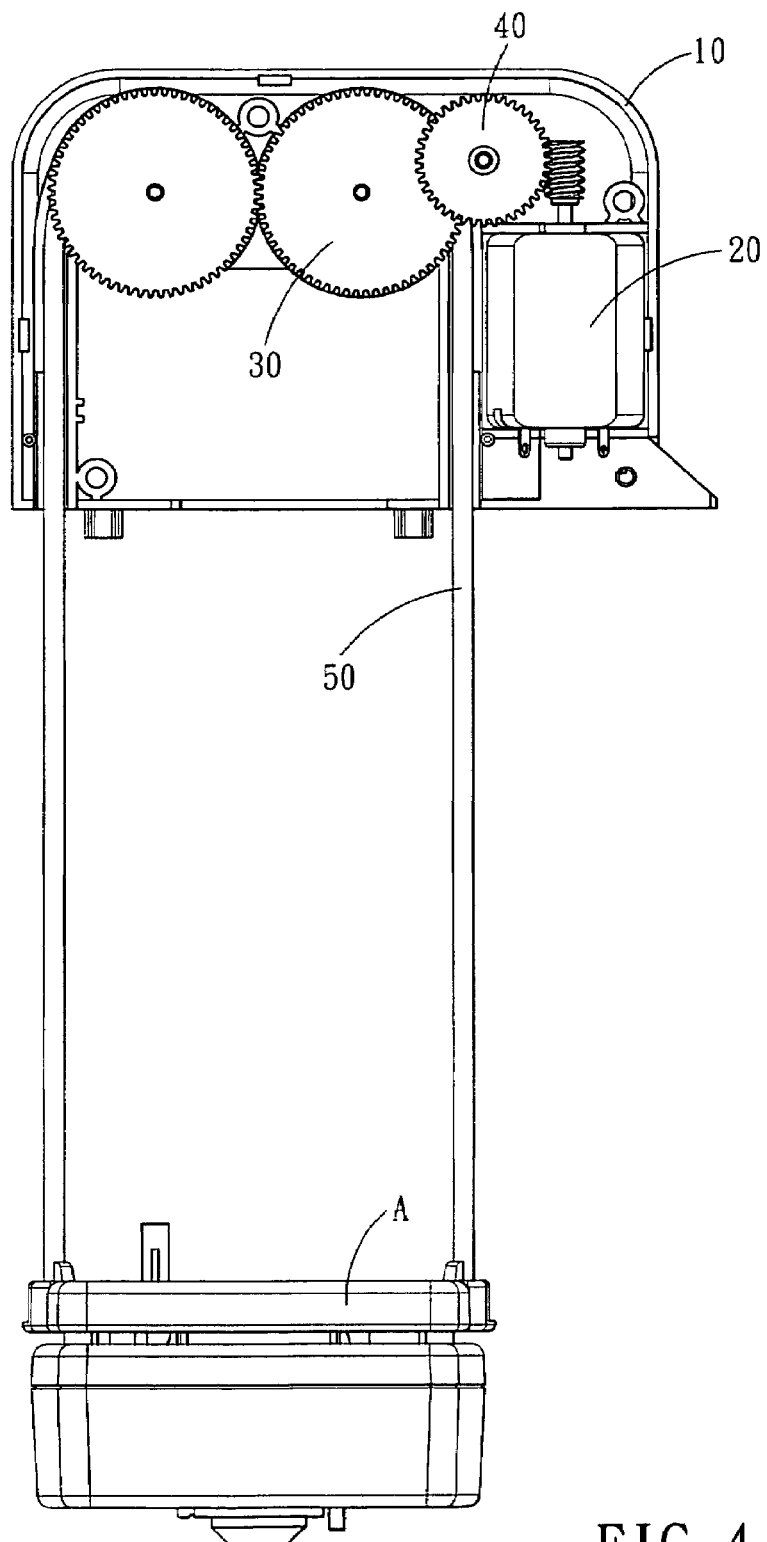
FIG. 4 shows that two elastic extension plates are assembled with a loading seat and extend outwards in accordance with the present invention.
Figure 5:
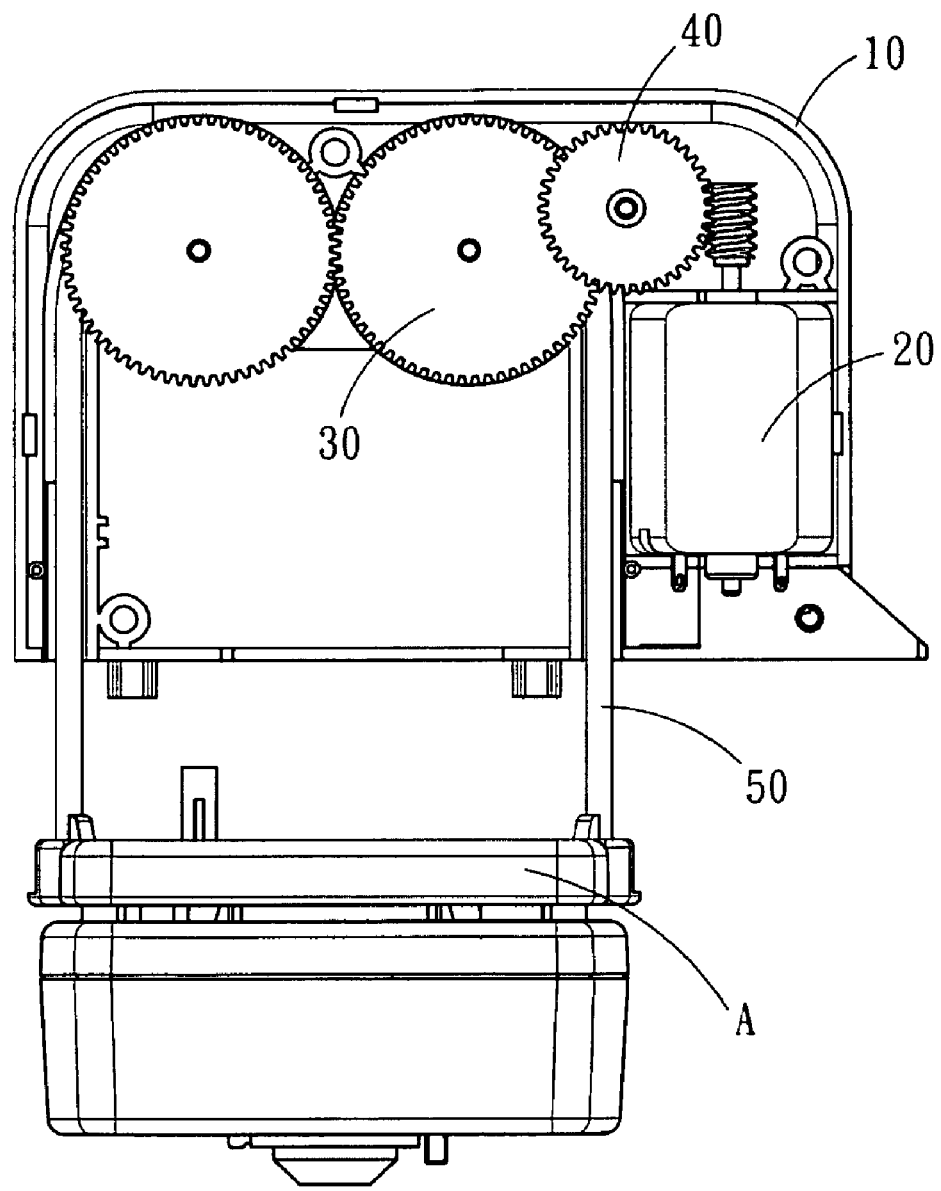
FIG. 5 shows that the two elastic extension plates are assembled with the loading seat and retract inwards in accordance with the present invention.

When in use, the power source 20 is used to drive at least one scroll wheel 30 to rotate, and when the two scroll wheels 30 are linked with each other to rotate synchronously, each elastic extension plate 50 wound on each scroll wheel 30 will be scrolled to extend out of or retract into the body 10. The power source 20 utilizes the driving mechanism 40 to drive one of the scroll wheels 30 to rotate, and the power source 20 being a motor is engaged with the input part 41 of the driving mechanism 40, so as to drive the driving mechanism 40 to rotate. The output part 42 of the driving mechanism 40 is engaged with the teeth 31 of one scroll wheel 30 to rotate this scroll wheel 30 to rotate. The two scroll wheels 30 are linked with each other by the engagement of their teeth 31. By such arrangements, the power source 20 will drive the two scroll wheels 30 to rotate synchronously, thus enabling the elastic extension plate 50 of each scroll wheel 30 to extend or retract synchronously. When the ends of the two elastic extension plates 50 extended out of the body are assembled with a loading seat A, the two elastic extension plates 50 can be used to move the loading seat A to change the distance between the loading seat A and the body 10, as shown in FIG. 4 and FIG. 5, thereby, the conveying operation can be carried out.

Figure 6:
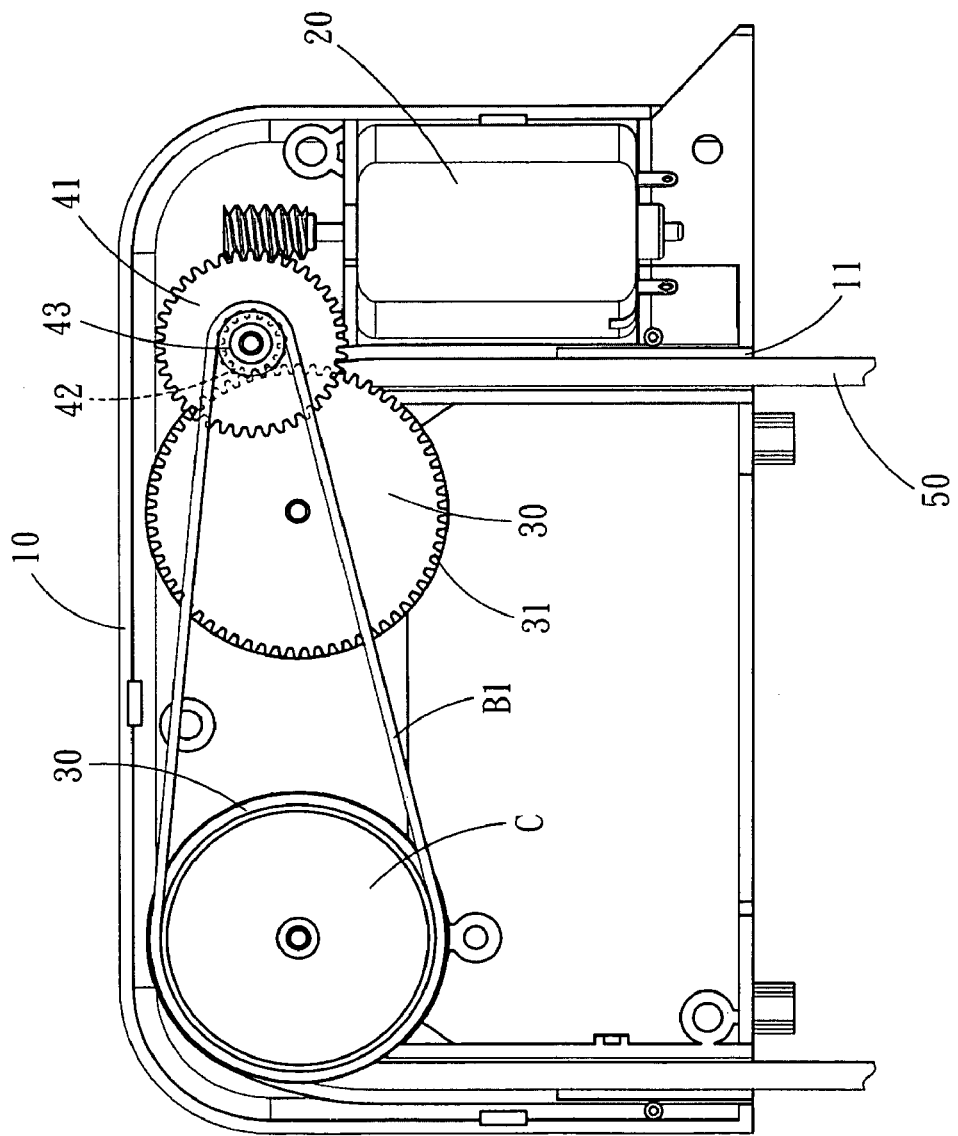
FIG. 6 shows that the two scroll wheels are driven to rotate by a belt in accordance with the present invention.

Moreover, besides the power source 20 utilizes the engagement of the driving mechanism 40 and one of scroll wheels 30 to drive in the abovementioned embodiment, the power source 20 can also be directly engaged with one or both of the scroll wheels 30 to drive. The power source 20 can also, as shown in FIG. 6, utilizes a driving mechanism 40 to synchronously drive the two scroll wheels 30 to rotate. The driving mechanism 40 of this embodiment is formed by the coaxial connection of an input part 41 and an output part 42 and a driving part 43. The input part and the output part are gears, and the driving part 43 is a belt pulley. The diameter of the input part 41 is larger than that of the output part 42 and the driving part 43. The periphery of one of the two scroll wheels 30 includes a plurality of teeth 31 used to engage with the output part 42, and one side of the other scroll wheel 30 is coaxially disposed a belt pulley C. A belt B1 is wound on the peripheries of the belt pulley C and the driving part 41. By such arrangements, the power source 20 can be engaged with the input part 41 of the driving mechanism 40 to drive the driving mechanism 40 to rotate, and the driving mechanism 40 utilizes the output part 42 to engage with and rotate one of the scroll wheels 30. The transmission part 43 utilizes the belt B1 to drive the other scroll wheel 30 with the belt pulley C to rotate. Moreover, the two scroll wheels 30 can still rotate synchronously in opposite directions, after a proper adjustment of the diameters of the output part 42 and the driving part 43 of the driving mechanism 40 and the diameters of the scroll wheel 30 with the belt pulley C and the belt pulley C.

In addition, the ends of the two elastic extension plates 50 extended out of the body can be assembled with not only the abovementioned loading seat A, but also a clamp, a structure which can be used to fix, load or position an object, etc.

As known from the abovementioned structure, the conveying method is to, respectively, from inside to outside, wind two elastic extension plates on two scroll wheels which have the same diameters, rotate synchronously in opposite directions and whose rotating axes are parallel to each other. The two elastic extension plates are elongated and have rigidity. The conveying operation is carried out by the following steps of: firstly, positioning the object on the two elastic extension plates and rotating the two scroll wheels, making the two elastic extension plates carry out the synchronous and equidistant displacement, lastly, releasing the object which has been moved to a predefined position by the two elastic extension plates.

To summarize, the conveying device of the present invention is assembled with a power source, two scroll wheels that are the same in diameter and linked with each other are assembled inside the body. Each scroll wheel is provided with an elongated elastic extension plate having rigidity. One end of each elastic extension plate is fixed on each scroll wheel. Each elastic extension plate is wound on each scroll wheel from inside to outside, and the other end extends out of the body. When in use, the power source will drive the two scroll wheels to rotate synchronously, so that the elastic extension plates of the two scroll wheels will extend out or retract in the body. When the ends of the two elastic extension plates extended out of the body are assembled with a structure which can be used to fix, load or position an object, the conveying operation can be carried out.

While we have shown and described various embodiments in accordance with the present invention, it is clear to those skilled in the art that further embodiments may be made without departing from the scope of the present invention.

What is claimed is:

1. A conveying device comprising:
a body formed with a gap;
a power source assembled in the body;
two scroll wheels of the same diameter rotating synchronously, and rotating axes of the two wheels being parallelly assembled in the body, the two scroll wheels rotating in opposite directions and at least one of the scroll wheels being driven by the power source; and
two elongated elastic extension plates with rigidity, one end of each elastic extension plate being fixed on each scroll wheel, and each elastic extension plate being wound on each scroll wheel from inside to outside, the other end of each elastic extension plate extending out of the body through the gap of the body, each elastic extension plate is driven to extend or retract through rotation of each scroll wheel, thus carrying out a conveying operation.

2. The conveying device as claimed in claim 1, characterized in that both peripheries of the two scroll wheels are formed with the same number of teeth, and the two scroll wheels rotate synchronously in opposite directions by engagement of their teeth.

3. The conveying device as claimed in claim 1, characterized in that the body further includes a driving mechanism which is driven to rotate by the power source and used to drive respective scroll wheels to rotate.

4. The conveying device as claimed in claim 3, characterized in that the driving mechanism is formed by a coaxial connection of an input part and an output part which are connected with the power source and one of the scroll wheels, respectively.

5. The conveying device as claimed in claim 4, characterized in that the input part and the output part of the driving mechanism are gears, and the input part and the output part are engaged with the power source and the scroll wheel, respectively.

6. The conveying device as claimed in claim 3, characterized in that the driving mechanism is formed by a coaxial connection of an input part, an output part and a driving part, the input part is connected with the power source, the output part and the driving part are, respectively, connected with the two scroll wheels.

7. The conveying device as claimed in claim 6, characterized in that both the input part and the output part of the driving mechanism are gears, and the driving part is a belt pulley, and the input part is engaged with the power source, the output part is engaged with one of the scroll wheels, the driving part utilizes a belt to drive the other scroll wheel to rotate.

8. The conveying device as claimed in claim 1, characterized in that a loading seat is assembled to the ends of the two elastic extension plates extended out of the body.

9. The conveying device as claimed in claim 1, characterized in that a clamp is assembled to the ends of the two elastic extension plates extended out of the body.

10. A conveying method comprising the steps of: winding two elastic extension plates, from inside to outside, onto two parallel scroll wheels of the same diameter and rotating synchronously in opposite directions; positioning an object on the two elastic extension plates, rotating the two elastic extension plates and making the two elastic extension plates move synchronously and equidistantly; releasing the object after it is moved to a predefined position, to accomplish the conveying operation.

* * * * *